United States Patent [19]

Cernoch

[11] 4,304,740

[45] Dec. 8, 1981

[54] LIQUID AERATION APPARATUS

[76] Inventor: Richard Cernoch, 143 Godfrey Ave., Port Charlotte, Fla. 33952

[21] Appl. No.: 83,803

[22] Filed: Oct. 11, 1979

[51] Int. Cl.$^3$ .............................................. B01F 3/04
[52] U.S. Cl. ................................... 261/121 R; 4/542; 119/5; 128/66; 128/369; 210/169; 210/220; 239/418; 239/428.5; 248/67.7; 261/122; 261/124; 261/DIG. 75
[58] Field of Search ............. 261/121 R, 121 M, 122, 261/124, DIG. 75; 248/67.7; 210/169, 220; 128/66, 369; 119/5; 43/56, 57; 4/542; 239/418, 428.5

[56] References Cited

U.S. PATENT DOCUMENTS

| 2,417,499 | 3/1947 | Ille | 4/452 |
| 2,799,866 | 7/1957 | Jawett | 261/DIG. 75 |
| 2,875,313 | 2/1959 | King | 248/67.7 X |
| 3,487,935 | 1/1970 | Lovitz | 210/169 |
| 3,717,253 | 2/1973 | Lovitz | 210/169 |
| 3,745,994 | 7/1973 | Kane | 128/66 |
| 3,904,393 | 9/1975 | Morse | 261/DIG. 75 |

Primary Examiner—Richard L. Chiesa
Attorney, Agent, or Firm—Hauke and Patalidis

[57] ABSTRACT

A removable light-weight, apparatus for the aeration of a body of water or other liquid in a tank or a pool having a submerged liquid source or inlet port supplying a continuous or a sporadic stream of liquid into said tank, said aeration apparatus comprising an air induction tube extending between and communicating at its upper and lower ends respectively with the ambient atmosphere and the liquid stream, and support means for said tube, the reduced pressure along the stream of liquid drawing air from the atmosphere into the liquid in the tank. A conduit may be provided coupled to the outlet of the liquid inlet port, the lower end of said air induction tube being inserted through the tubular wall of said conduit so as to permit the air in the lower end of the air induction tube to communicate with the liquid moving through the conduit, said conduit preferably terminating in a filter or a diffuser.

4 Claims, 10 Drawing Figures

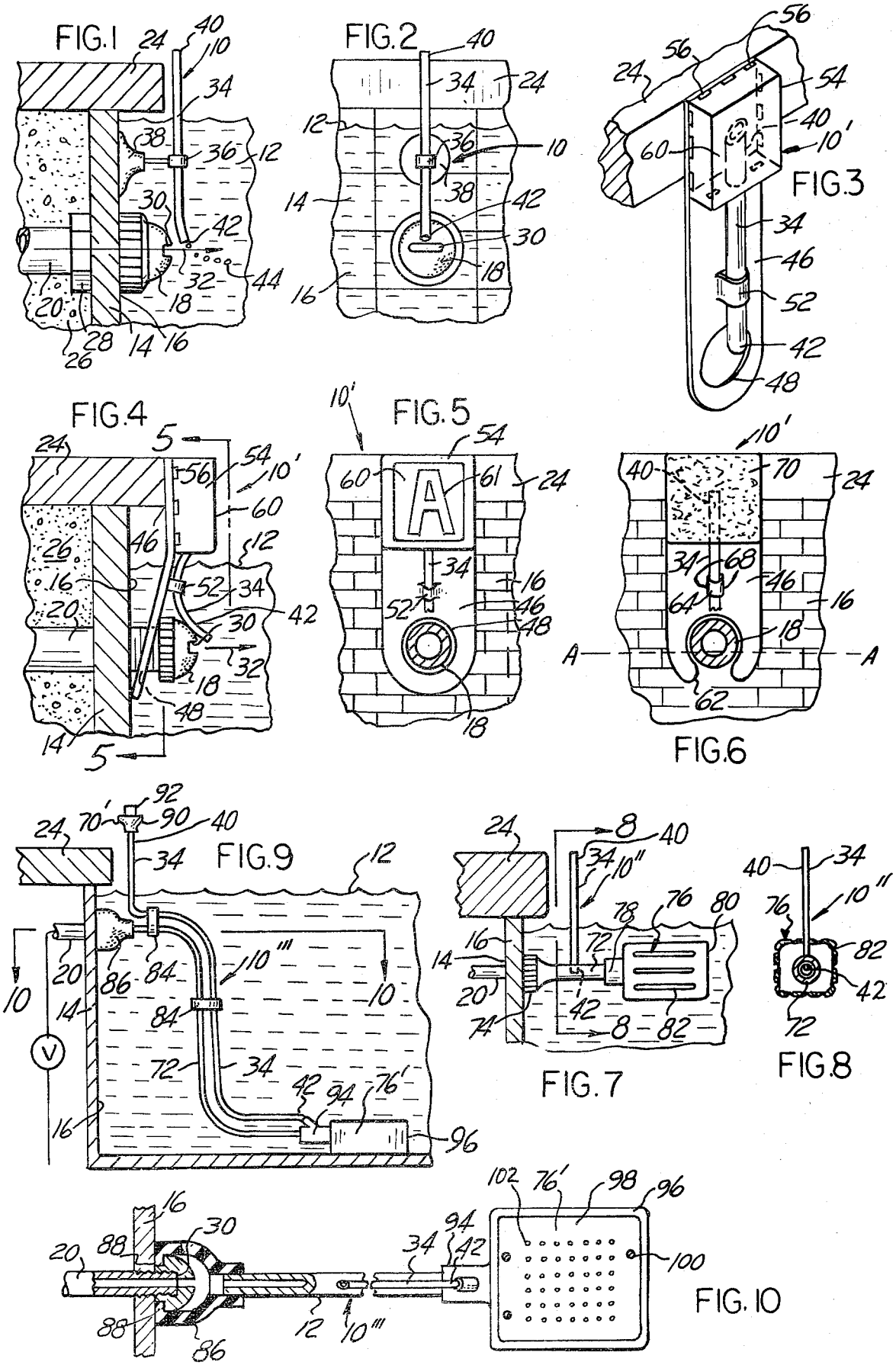

LIQUID AERATION APPARATUS

BACKGROUND OF THE INVENTION

The present invention relates, in general, to liquid aeration devices and more particularly to an add-on or accessory liquid aeration device for use with a tank of liquid having an existing liquid source or inlet port below the surface of the liquid and supplying a steady or sporadic flow of liquid into the tank.

Aeration and bubble massage devices are known and are gaining a new popularity through the growth of membership in and numbers of health clubs as well as through the increase in the number of households with private whirlpools or spas. Nonetheless, a considerable number of swimming pools, whirlpools, hot tubs, and bathtubs have little or no capability for aeration of the water. It would be advantageous to aerate the water in these tanks in order to purify the water and help impart an attractive blue color to the water. While the tank or pool may already be equipped with a filtration system, the use of aeration reduces the amount of chlorine needed since the tendency for the growth of undesirable bacteria and algae is greatly reduced. Also, if the aeration occurs at a sufficiently vigorous pace, a pleasant bubble massage will be available to the occupant.

Use of a similar aerator in aquarium tanks or artificial fishponds is even more desirable for its purifying properties, since the alternative, chlorine, is poisonous to aquatic life. Furthermore, since the fish within the aquarium or pond breath oxygen from the water and since the amount of oxygen dissolved in the water is otherwise limited by the surface area at the top of the aquarium or pond, vigorous aeration of the water allows a wider variety in and quantity of aquatic life to be maintained in a healthful condition in the tank.

Traditional methods for aeration of tanks, particularly those for aquatic life, include the use of an electric air pump forcing air along a tube into the tank. An alternative method, using the power of the water from an external faucet has been particularly popular for use with bathtubs. Invariably, the add-on or accessory devices of this second type, such as those disclosed in U.S. Pat. Nos. 1,982,258; 1,982,259; 2,668,299; 2,799,866; 3,541,616 and 3,587,976 are elaborate devices for coupling to the external source of water, some doing permanent harm to the tank or faucet, and others making it difficult to use the faucet normally.

Most current swimming pools, whirlpools baths, hot tubs, and spas, as well as many older bathtubs and a few aquariums and artificial fish ponds, have a submerged water source, such as a nozzle supplying fresh or recycled and cleansed water to the tank in a constant or sporadic stream. Such a water source allows use of far less permanent, intricate and expensive devices as well as permitting use of a far more attractive device, particularly since there is less need to be concerned about leaks.

What is needed, therefore, is a simplified and light-weight water aeration apparatus which may be removably added to a tank or pool with an existing water inlet source below the surface of the water.

SUMMARY OF THE INVENTION

The present invention accomplishes its objects by providing a removable, light-weight aeration apparatus adaptable as an accessory to a tank of liquid having an existing submerged liquid inlet port and particularly by providing an air induction tube extended between the ambient atmosphere, at its upper end, and the stream of liquid at the outlet of said inlet port at the lower end of the tube, the reduced pressure along said liquid stream drawing air from the atmosphere into the fluid.

A conduit may be connected to the inlet port to direct the flow of the stream of liquid, the lower end of the air induction tube being inserted through the outer wall of the conduit so that air is drawn into the conduit and mixed with the liquid therein. In this embodiment, the outlet end of the conduit is preferably fitted with a filter or a diffuser, allowing the air and liquid mixture to be released in a more dispersed fashion than otherwise would occur.

The many objects and advantages of the present invention will become apparent to those skilled in the art when the following detailed description of the preferred embodiments is read in conjunction with the attached drawing wherein like reference numerals refer to like components throughout and wherein:

BRIEF DESCRIPTION OF THE DRAWING

FIG. 1 is a side elevational view of an example of an aeration apparatus according to the present invention mounted within an inground tank, the tank wall being shown in partial cross-section;

FIG. 2 is a front elevational view of the aeration apparatus of FIG. 1;

FIG. 3 is a perspective view of an aeration apparatus, similar to that of FIGS. 1 and 2 but showing modifications thereof;

FIG. 4 is a side elevational view similar to that of FIG. 1 showing the aeration apparatus of FIG. 3 mounted within a tank;

FIG. 5 is a partial cross section view taken along line 5—5 of FIG. 4;

FIG. 6 is a partial cross section view similar to that of FIG. 5, but showing a further modification thereof;

FIG. 7 is a side elevational view of an alternate example of an aeration apparatus according to the present invention mounted to the inlet port on the wall of a tank;

FIG. 8 is a cross-sectional view taken along line 8—8 of FIG. 7;

FIG. 9 is a schematic side elevational view of a modification of the example of structure of FIGS. 7 and 8; and FIG. 10 is an enlarged top plan view and partial cross-sectional view taken along line 10—10 of FIG. 9.

DETAILED DESCRIPTION OF THE PREFERRED EMBODIMENT

Referring now to the drawing and particularly to FIGS. 1 and 2 thereof the present invention contemplates in its most general form, an aeration apparatus 10 for supplying air from the ambient atmosphere to a liquid 12 stored in a tank 14 having on at least one wall 16 a submerged liquid inlet port 18. The tank 14 can be any container of liquid, such as a bathtub, swimming pool, whirlpool, spa, aquarium, or chemical storage tank into which it is desirable to bubble air. For the purpose of illustration, however, the various examples of structure are shown mounted to a tiled wall 16 of a swimming pool 14 having a tile or concrete ledge 24 at the top of the wall 16. The pool 14 is shown submerged into the ground 26 and is continuously or sporadically supplied with fresh or recycled filtered water through the inlet port 18 which here consists of a pipe 20 on the end of which is threaded a nozzle 30 directing a stream of water, indicated in FIG. 1 by arrow 32, into the tank below the surface of the water. A nut 28 on the opposite side of the wall 16 helps hold the inlet pipe 20 in place.

In the example of structure shown in FIGS. 1 and 2, the aeration apparatus 10 consists of an air induction tube 34 mounted by means of a support bracket in the form of a clamp 36 on the end of a suction cup 38 to the tile on wall 16 so as to support the air induction tube 34 vertically between the stream 32 and the ambient atmosphere above the tank. At the upper and lower ends, 40 and 42 respectively, of the air induction tube 34 there are openings allowing the air within the tube to communicate with the ambient atmosphere and the stream 32. Since the pressure of the water at the outlet of the nozzle 30 will be below the atmospheric pressure, a suction force will be generated at end 42 of the tube 34, thus drawing air from the atmosphere through the upper end 40, through the tube 34, and, finally, releasing it at the lower end 42 into the stream 32 in the form of air bubbles 44.

FIGS. 3-5 depict a modification 10' of the above described aeration apparatus wherein the induction tube 34 is secured to the wall 16 of the tank 14 by means of a mounting bracket 46, preferably made from a rectangular metallic stamping. One or more support clips 52 for the induction tube 34 may be integrally formed in the bracket 46 during the stamping process to hold the induction tube 34 in place. At the lower end of the bracket 46, a circular aperture 48 is provided for mounting the bracket on the end of the inlet pipe 20. For the purpose of attaching the aeration apparatus 10', the nozzle 30, not shown in FIG. 5, is temporarily unthreaded from the end of the inlet pipe 20 and the bracket 46 is mounted to the pipe 20. When the nozzle 30 is then threaded back onto the inlet pipe 20, FIG. 4 it forces the bracket 46 back towards the wall 16 until the uppermost portion of the bracket 46 encounters the ledge 24. As is readily apparent, the bracket will then bend and the spring force thus generated will result in a frictional force between the bracket and the ledge, thereby keeping the apparatus 10' in position.

A hollow rectangular housing 54 is mounted at the uppermost end of the bracket 46 such as to surround the upper end 40 of the air induction tube 34, thus improving the aesthetic appearance of the aeration apparatus. A number of small air inlet slots 56 around the perimeter of the housing 54 are provided for the ingress of air. If desired, the housing 54 may be molded of plastic or stamped from sheet metal and may be dipped or painted so as to visually contrast with the bracket 46. The face 60 of the housing 54, if desired, may be covered with a trademark, advertising material, or any desirable decorative matter, such as a picture of a fish or, as shown at 61, the surname initial of the pool owner.

FIG. 6 depicts an aeration apparatus 10' similar to that shown in FIGS. 3-5 but with several modifications. In place of the circular mounting aperture 48 of FIGS. 3-5, in the example shown in FIG. 6 the lower end of the bracket 46 has a U-shaped slot 62 defining a bifurcated clamp such that the bracket 46 may be mounted to the wall 16 of the tank 14 without removing the nozzle 30. As a result, this modification 10' may be installed in any pool or tank that has an inlet pipe 20 with an end portion having a two stepped outer diameter, the larger diameter being further from the wall. The bracket is held in place, as above, by means of a spring force generated by initially elastically deflecting the bracket 46 when inserting it in place in the tank. Where the ledge 24 is negligible or non-existant, the bracket 46 may be bent in the stamping operation, for example along line A—A of FIG. 6 such as to form an interference fit between the back side of the nozzle 30 and the tiled wall 16.

The air induction tube 34 is, attached to the bracket 46 by means of a clamp 64 consisting of a small thin elongated rectangular strip of spring steel wrapped around the air induction tube 34. The ends of the clamp 64 pass through a pair of slots 68 in the bracket 46 and are either bent together or bolted together behind the bracket. Alternatively, the air induction tube 34 may be secured to the bracket 46 by means of a wire, a ribbon, or a thread wrapped around the air induction tube, each end of the wire or thread passing through a small hole in the bracket 46, the ends being knotted together therebehind.

In the place of the air inlet housing 54 described above, the structure in FIG. 6 has an air silencer 70, preferably consisting of a block of foam such as sponge rubber or plastic into which the upper end 40 of the air induction tube 34 is inserted. The air silencer 70 may be glued or clamped to the top of the bracket 46 or, alternatively, may be secured only by the frictional forces between the block of foam and the air induction tube 34 and by gravity. The air silencer 70 should be located sufficiently above the waves within the tank to avoid the saturation of the block of foam.

FIGS. 7-8 show an alternate example of structure 10" of the present invention wherein a conduit 72 is coupled to the inlet pipe 20 such as to direct and contain the stream of water for some distance and aerate it prior to releasing the water into the tank. The lower end 42 of the air induction tube 34 passes through an aperture in the cylindrical wall of the conduit 72 and is open therewithin to communicate with the water stream 32. The air induction tube 34 is shown constructed of substantially rigid material so as to require no additional support beyond that provided by the conduit 72. Alternatively, additional support means may be provided, such as a variation of the suction cup and hook or the bracket previously described.

As seen in FIG. 7, the nozzle 30 has been removed so that a fitting 74 on the end of the conduit 72 can be threaded on the end of the inlet pipe 20. At the other end of the conduit 72 is a filter or diffuser 76 consisting of a cylindrical or parallelpipedonal housing closed on one end face 80 and having a fitting 78 on its other end face for coupling with the conduit 72. Around the perimeter of the housing of the filter 76 are a number of longitudinal slots 82 allowing the diffused and dispersed release of the air and water mixture. Charcoal, cotton, or any other appropriate filtering material may be placed within the housing and may be conveniently removed and changed periodically through the opening of the fitting 78.

As shown in FIG. 7, the conduit 72 may be short and straight with the filter 76 in line with the stream 32. Alternatively, the conduit may be bent so that the filter 76 has any convenient orientation. For example, and as shown in FIG. 9 described below, the stream conduit 72 and the air induction tube 34 may be fairly long and clamped together periodically along the length of the tube 34 and the conduit 72 as shown at 84, delivering the aerated fluid, and bubble massage to any desired location of the tank or pool.

In FIG. 10, illustrating another example of an aeration apparatus 10''' similar to that in FIGS. 7 and 8 but showing a further modification thereof, the nozzle 30 remains attached to the water inlet pipe 20. A hollow elastic pear-shaped fitting 86 coupled to the end on conduit 72 is stretched to fit over the nozzle 30 so as to direct the stream at the outlet of the nozzle into the conduit 72. A sufficient seal may be created from the elastic forces exerted by the fitting itself around the nozzle 30, or, if necessary, a seal may be affected by partially tightening the nozzle 30 on the threaded inlet pipe 20 towards the wall 16 such as to squeeze the skirt portion 88 of the fitting between the back of the nozzle 30 and the tiled wall 16, as shown in FIG. 10. It should be noted that a small amount of leakage from the fitting is permissible, and thus the fit is not as critical as it would be were the water source outside of the tank.

An alternate type of air silencer 70' is shown in FIG. 9 consisting of a circular cup-like fitting 90 mounted on the upper end 40 of the air induction tube 34 and a cylindrical block of foam 92 inserted into the fitting 90. The lower end 42 of the air induction tube 34 is connected to the first arm of a Y-shaped hollow fitting 94 extending from a filter diffuser 76'. The second arm of the fitting 94 is coupled to the end of the conduit 72.

The diffuser 76', as best shown in FIG. 10, has a box-like frame or tray 96 on the top surface of which is secured by means of screws 100, a plate 98, with an array of small apertures or outlets 102 causing the air and water mixture to be released in a diffused or dispersed manner such as to aerate the water more thoroughly. Charcoal or other appropriate filtering material may be placed within the diffuser or filter 76' to further purify the water. Alternatively, and in place of the plate 98 and filtering material, a block of foam may be inserted within the frame of the diffuser, the cellular structure of the foam causing a diffused release of the air and water mixture.

The preceding description of the present invention by means of several examples of structure is presented by way of explanation and not by way of limitation to illustrate the best modes contemplated at the time of filing for carrying out the invention, modifications whereof will be apparent to those skilled in the art.

What is claimed as novel is as follows:

1. In a tank containing a body of liquid and having on at least one wall, a submerged inlet port through which a stream of liquid is at least sporadically injected into said tank, said inlet port being disposed at an end of a length of pipe extending from said inlet port into said body of liquid, said length of pipe having a small diameter portion close to said tank wall and a larger stepped-up diameter portion away from said tank wall, an aeration apparatus for aerating said stream of liquid when said stream is injected into said tank, said apparatus comprising an air induction tube having two open ends, and means removably securing said air induction tube in a position such that the first of said open ends is disposed outside of said body of liquid in communication with the ambient atmosphere and the second of said open ends is submerged within said body of liquid adjacent to said submerged inlet port, said means securing said air induction tube in position comprising a support bracket having means securing said air induction tube to said support bracket and means securing said support bracket adjacent to said inlet port, wherein said support bracket is a rectangular stamping having means removably securing said support bracket directly to said length of inlet pipe, and wherein said means removably securing said bracket to said length of inlet pipe comprises said support bracket having a bifurcated lower end, said bifurcated end being inserted over said smaller diameter portion of said inlet pipe, said support bracket being elastically deflected such that said larger diameter portion biases said bracket against said tank wall.

2. The aeration apparatus of claim 1 further comprising a block of porous material disposed at said first end of said air induction tube.

3. In a tank containing a body of liquid and having on at least one wall, a submerged inlet port through which a stream of liquid is at least sporadically injected into said tank, said inlet port being disposed at an end of a length of pipe extending from said inlet port into said body of liquid, said length of pipe having a small diameter portion close to said tank wall and a detachable larger stepped-up diameter portion away from said tank wall, an aeration apparatus for aerating said stream of liquid when said stream is injected into said tank, said apparatus comprising an air induction tube having two open ends, and means securing said air induction tube in a position such that the first of said open ends is disposed outside of said body of liquid in communication with the ambient atmosphere and the second of said open ends is submerged within said body of liquid adjacent to said submerged inlet port, said means securing said air induction tube in position comprising a support bracket having means securing said air induction tube to said support bracket and means securing said support bracket adjacent to said inlet port, wherein said support bracket is a rectangular stamping having means removably securing said support bracket directly to said length of inlet pipe, and wherein said means removably securing said support bracket to said length of inlet pipe comprises said support bracket having a circular aperture, said circular aperture being disposed about said small diameter portion of said inlet pipe between said detachable larger stepped-up diameter portion and said tank wall, said support bracket being elastically deflected such that said larger diameter portion biases said support bracket against said tank wall.

4. The aeration apparatus of claim 3 further comprising a block of porous material disposed at said first end of said air induction tube.

* * * * *